(12) United States Patent
Yamaguchi et al.

(10) Patent No.: US 6,457,964 B1
(45) Date of Patent: Oct. 1, 2002

(54) POSITION CONTROL APPARATUS

(75) Inventors: Yutaka Yamaguchi, Shizuoka-ken; Masamitsu Suzuki; Makoto Nishizawa, both of Numazu; Takashi Yamazaki, Mishima; Takahiro Furuno, Gamagoori, all of (JP)

(73) Assignee: Toshiba Machine Co. Ltd., Tokyo (JP)

( * ) Notice: Subject to any disclaimer, the term of this patent is extended or adjusted under 35 U.S.C. 154(b) by 111 days.

(21) Appl. No.: 09/640,909

(22) Filed: Aug. 18, 2000

(30) Foreign Application Priority Data

Aug. 19, 1999 (JP) .......................................... 11-232682

(51) Int. Cl.⁷ ............................................. B29C 45/80
(52) U.S. Cl. ........................ 425/150; 264/40.5; 425/542
(58) Field of Search .................................. 425/150, 542; 264/40.5

(56) References Cited

U.S. PATENT DOCUMENTS 5,885,624 A * 3/1999 Katsuta et al. ............... 425/150
5,906,777 A * 5/1999 Kamiguchi et al. .......... 425/150

* cited by examiner

*Primary Examiner*—Tim Heitbrink
(74) *Attorney, Agent, or Firm*—Pillsbury Winthrop LLP

(57) ABSTRACT

In a position control apparatus, the rate and the torque of the servomotor are monitored, wherein when it is detected that the servomotor is locked, the torque is limited, so that renewal of a command position to be supplied to the servomotor driving unit is stopped.

7 Claims, 5 Drawing Sheets

POSITION CONTROL APPARATUS

CROSS-REFERENCE TO RELATED APPLICATIONS

This application is based upon and claims the benefit of priority from the prior Japanese Patent Application No. 11-232682, filed Aug. 19, 1999, the entire contents of which are incorporated herein by reference.

BACKGROUND OF THE INVENTION

The present invention relates to a position control apparatus for controlling the position of a movable part, for example, a movable mold, driven by a servomotor in a motor-driven injection molding machine. The position is controlled by monitoring the present position of the movable mold, the positional error between the present position and the target position and the rotation rate of the servomotor.

In a conventional motor-driven injection molding machine, the position of a movable part driven by a servomotor is controlled by supplying to the servomotor a current periodically output in accordance with a command position.

According to the conventional method, however, there may be a positional error between the present position of the movable part and the target position, if a product is jammed between the movable part and a fixed part or if the servomotor cannot rotate due to a high load relative to a low torque command. To compensate for the positional error, position command values are successively renewed and output. The renewed position command values have commands for gradually increasing the drive current of the servomotor.

If the above state lasts long, an overcurrent flows through the servomotor, resulting in burning. To prevent this, the control unit incorporated in the motor-driven injection molding machine determines that an error occurs, so that the operation of the machine is stopped. Once the operation is stopped, half-produced products are disposed of as inferior goods. In addition, a number of procedures are required to restart the operation, resulting in reduction of the yield or the operation efficiency. Further, since a large current flows through the servomotor, if the jammed product happens to remove during the operation, the servomotor will be rotated at a very high speed. Therefore, the operator may be exposed to danger and the machine may be damaged.

BRIEF SUMMARY OF THE INVENTION

Accordingly, an object of the present invention is to provide a position control apparatus which does not allow an overcurrent to flow through a servomotor, if the servomotor is locked due to product jam, etc., so that reduction in yield and operation efficiency can be prevented, no danger may be posed to the operator, and damage to the machine can be avoided.

According to the present invention, the above object is achieved as follows: when the servomotor is unable to rotate because of product jam or the like in an apparatus to be controlled, a position control process prohibits a position command value from being renewed, so that positional errors may not be accumulated.

A position control apparatus of the present invention comprises: a servomotor for driving a movable part of a motor-driven injection molding machine; position command means for renewing a position command value of the movable part, output in a predetermined cycle in accordance with a positional error between a present position and a target position of the movable part; limiting means for limiting a current value supplied to the servomotor, when the positional error is equal to or greater than a predetermined value or a rate of the servomotor is equal to or smaller than a predetermined value; and means for stopping a renewal of the position command value or extending a renewal cycle thereof, when the current value is limited.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described in detail with reference to the drawings.

Figure 1:
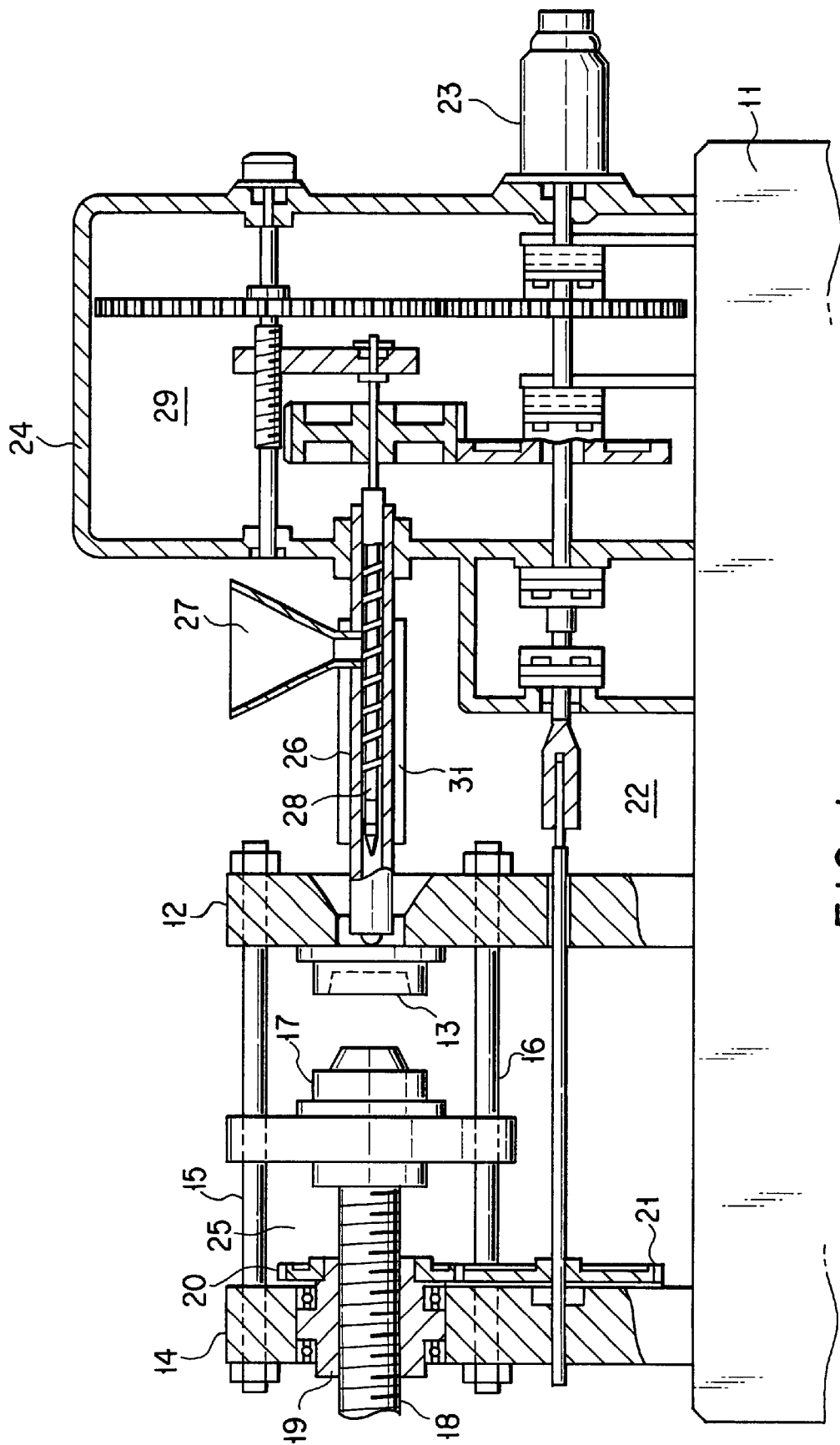
FIG. 1 is a diagram showing the overall mechanism of a motor-driven injection molding machine according to an embodiment of the present invention.

FIG. 1 is a structural diagram showing an outline of the overall mechanism of a motor-driven injection molding machine according to an embodiment of the present invention. A fixed mold 13 is fixed to one side of a frame 12 fixed at right angles to a base 11.

Another frame 14 is arranged at a predetermined distance from the frame 12. Slide rods 15 and 16 are set horizontally across the two frames 12 and 14. A die for a movable mold 17 is slidably held on the slide rods 15 and 16.

An end of a male screw 18 is fixed to a central portion of the movable mold 17. The male screw 18 is screwed into a female screw formed in a central portion of a bearing 19. The bearing 19 is rotatably mounted in the frame 14. A first gear 20 is formed on a side of the bearing 19.

The first gear 20 of the bearing 19 meshes with a second gear 21 rotatably attached to the same side of the frame 14. The second gear 21 is coupled with a rotation shaft of a servomotor 23 fixed to a frame 24. The male screw 18 and the first and second gears 20 and 21 form a screw-nut clamping device 25. With this structure, when the servomotor 23 is driven, the gears 21 and 20 are driven via a link mechanism 22 and the bearing 19 is rotated. As a result, the male screw 18 is moved left and right.

On the other side of the frame 12, an end of a pipe-shaped injection sheath 26 is fixed. The other end of the sheath 26 is fixed to the frame 24. The injection sheath 26 has a hole in its side wall. A hopper 27 is attached to the hole, so that a material of injection molding, such as thermoplastic material, is introduced in the injection sheath 26.

A transfer screw 28 is inserted in the injection sheath 26. The rear end of the screw is connected to the rotation shaft of the servomotor 23 through a gear mechanism 29 constituted by a plurality of gears. A heater 31 is attached to the outside of the injection sheath 26, so that the injection molding material is heated to a molten state.

A structure of the control system of the motor-driven injection molding machine according to the present invention, having the above mechanism, will be described in detail with reference to FIGS. 2 and 3.

Figure 2:
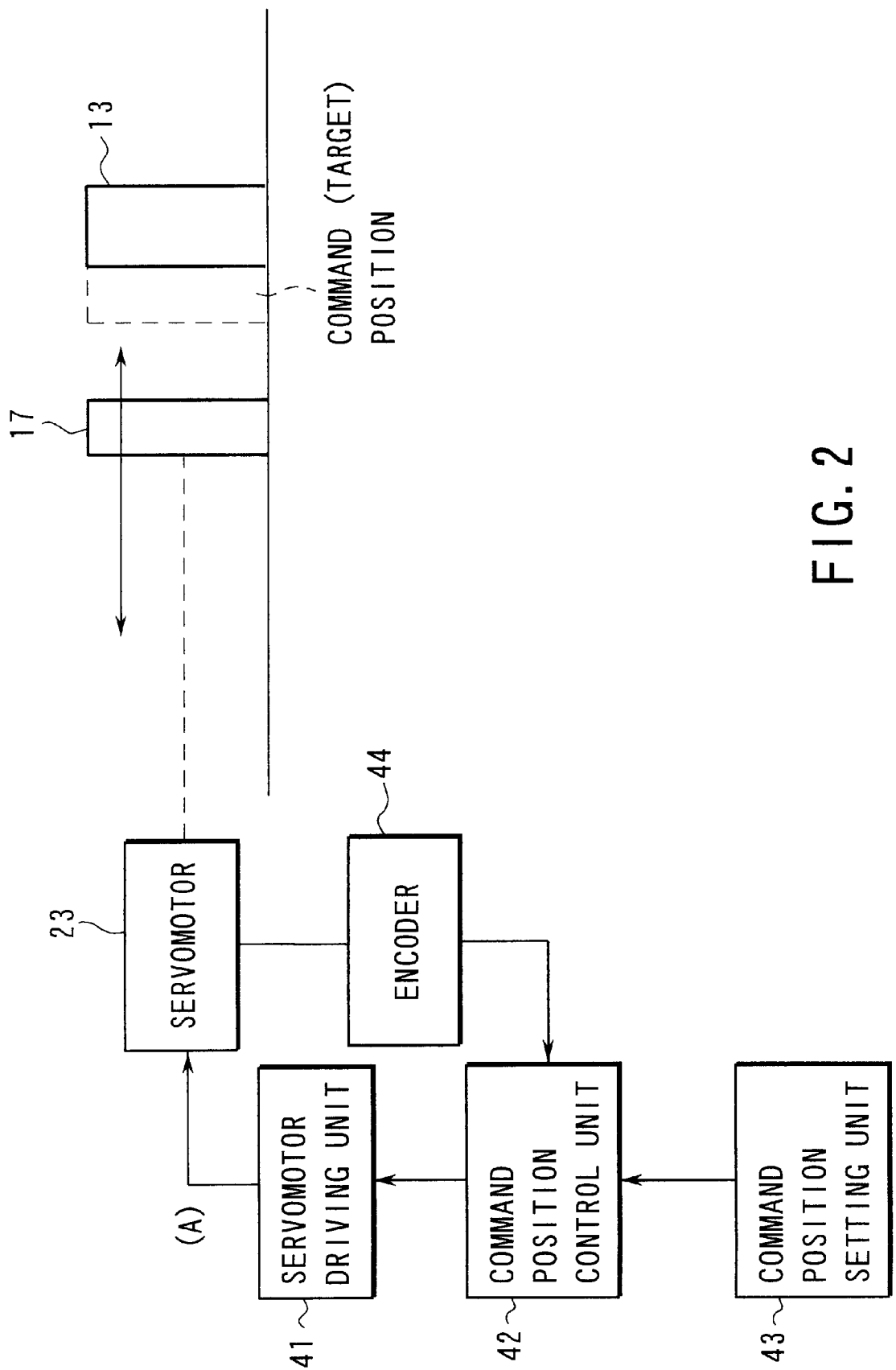
FIG. 2 is a block diagram showing a control system of the motor-driven injection molding machine shown in FIG. 1.
Figure 3:
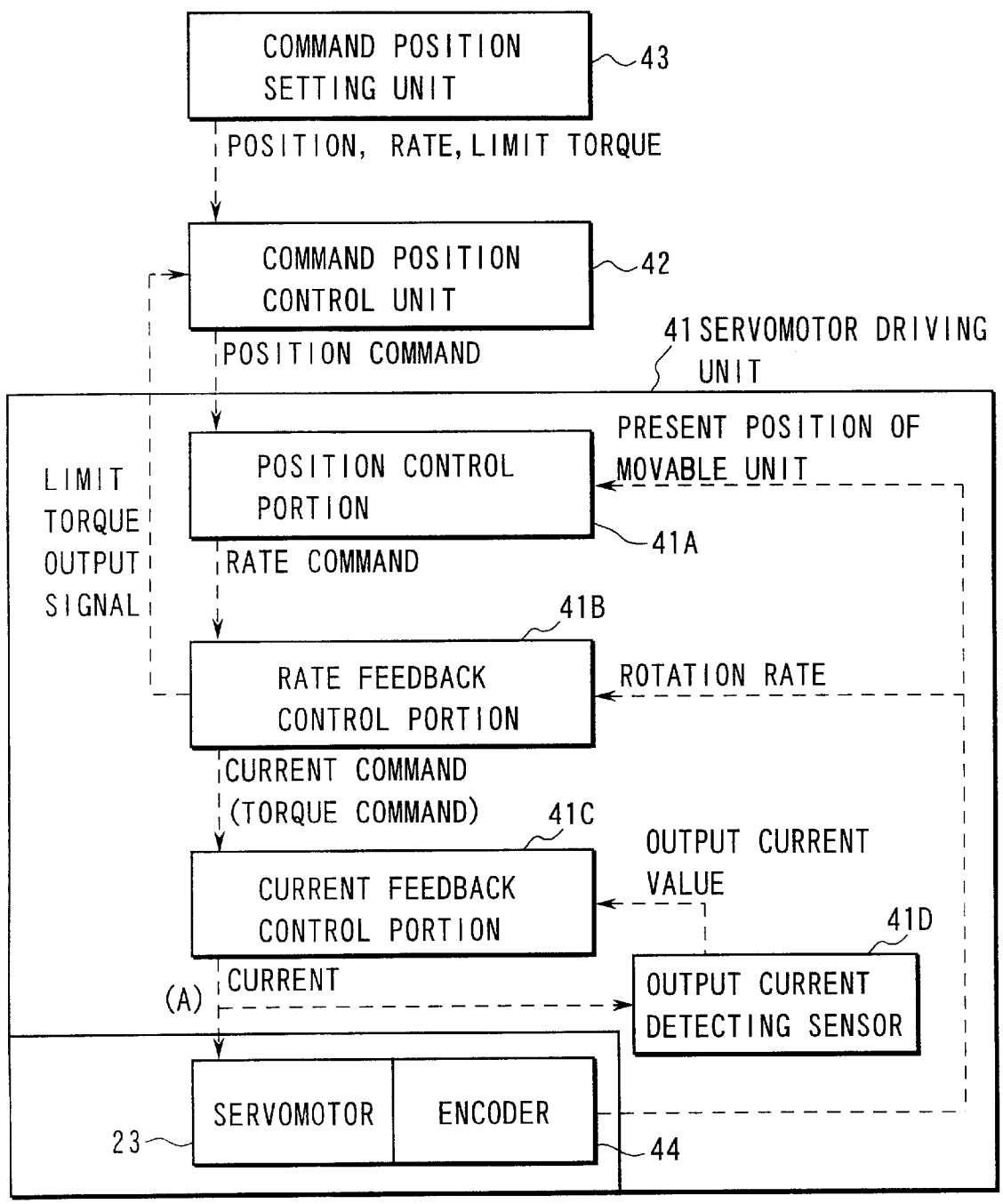
FIG. 3 is a block diagram showing a detailed structure of the control system shown in FIG. 2.

As shown in FIG. 2, the servomotor 23 is driven by a servomotor driving unit 41. The servomotor driving unit 41 supplies a predetermined driving current to the servomotor 23 based on a position command from a command position control unit 42. The command position control unit 42 is operated on the basis of a position command set by a command position setting unit 43. An encoder 44 is coupled to the servomotor 23 to detect the rotation rate and the present position of the movable unit, i.e., the movable mold 17.

As will be described later, the movable mold 17 is finally moved to the position (command position or target position), indicated by the broken line, where it is pressed against the fixed mold 13.

A structure of the servomotor driving unit 41 shown in FIG. 2 will now be described in detail with reference to FIG. 3.

A command position of the movable mold 17, a rate of the servomotor 23 and a value of a current supplied to the servomotor 23 are set in the command position setting unit 43.

The command position control unit 42 controls the driving unit 41 for driving the servomotor 23 based on the set values in the command position setting unit 43.

The servomotor driving unit 41 comprises a position control portion 41A and a rate feedback control portion 41B. The position control portion 41A functions as means for detecting a positional error between the present position of the movable mold 17 obtained by the encoder 44 and the positional command supplied from the command position control unit 42. The rate feedback control portion 41B serves as means for detecting a difference between the present rate and the command rate of the servomotor 23 supplied from the position control portion 41A. The rate feedback control portion 41B outputs a limit torque command to the command position control unit 42, when the positional error is equal to or greater than a predetermined value and the rate difference is equal to or smaller than a predetermined value.

The servomotor driving unit 41 further comprises a current feedback control portion 41C for supplying a predetermined current to the servomotor 23 based on the current (torque) command from the rate feedback control portion 41B, and supplying a torque limit current to the servomotor 23, when the value of the current, which flows through the servomotor 23 when the limit torque command is output, exceeds the predetermined value. The value of the current supplied to the servomotor 23 by the current feedback control portion 41C is detected by an output current detecting sensor 41D. The detection output is fed back to the current feedback control section 41C.

As will be described in detail later, according to this embodiment, when the torque limit current is supplied to the servomotor 23, renewal of the position command value supplied from the command position setting unit 43 to the servomotor driving unit 41 via the command position control unit 42 is stopped.

In other words, the command position control unit 42 has means for stopping renewal of the command position every unit time by the limit torque output signal supplied from the rate feedback control portion 41B in the servomotor driving unit 41. In this case, the rate feedback control portion 41B limits an output current by the limit torque value, and outputs a limit torque output signal when the output current is limited by the limit torque.

The rate feedback control portion 41B has means for outputting a limit torque current output signal to limit the current command for the current feedback control portion 41C to the limit torque.

The rate feedback control portion 41B outputs the limit torque current output signal as a limit current command value to the current feedback control section 41C in order to command to the current feedback control portion 41C the limit current control value calculated from the limit torque command value.

A position control operation of the motor-driven injection molding machine of the embodiment having the structure shown in FIGS. 1 to 3 will be described below with reference to FIGS. 4 to 7.

The position control process mainly includes the following three steps.

1. A present position calculating process in a step S1 shown in FIG. 7 (a process of calculating the present position).

2. A rate command calculating step in a step S2 (a process of obtaining a positional error from the present position and the positional command and calculating a rate command. The rate command calculated in this step is subjected to a rate control process in a step S3 for calculating a motor torque command.)

3. A position command distributing process in a step S7 (a process of calculating a position command).

A motor torque monitoring process in a step S5 and a command position distribution temporarily stopping process in a step S8 are added to the above processes. Thus, the position control is performed.

In the motor torque monitoring process in the step S5, whether the motor torque command reaches a torque limit (an upper limit of the output motor torque) is monitored. The torque limit is determined in consideration of the durability of the servomotor, the servo-amplifier, the machine, etc.

In the torque limit ON check step S6, as a result of the motor torque monitoring process, if it is determined that the motor torque command reaches the torque limit, the position command calculating process is not carried out. If the motor torque command does not reach the torque limit, the position command calculating process is carried out.

Owing to these added processes, in the case where the servomotor 23 is unable to rotate because of product jam between the movable mold 17 and the fixed mold 13, the position command value is not renewed. Therefore, positional errors do not accumulate, the positional error does not become excessively large, and the machine does not stop.

Even if the jammed product is removed during the operation, since positional errors are not accumulated, an erroneous rate is not output in the position control process, resulting in a safety operation of the machine.

Figure 4:
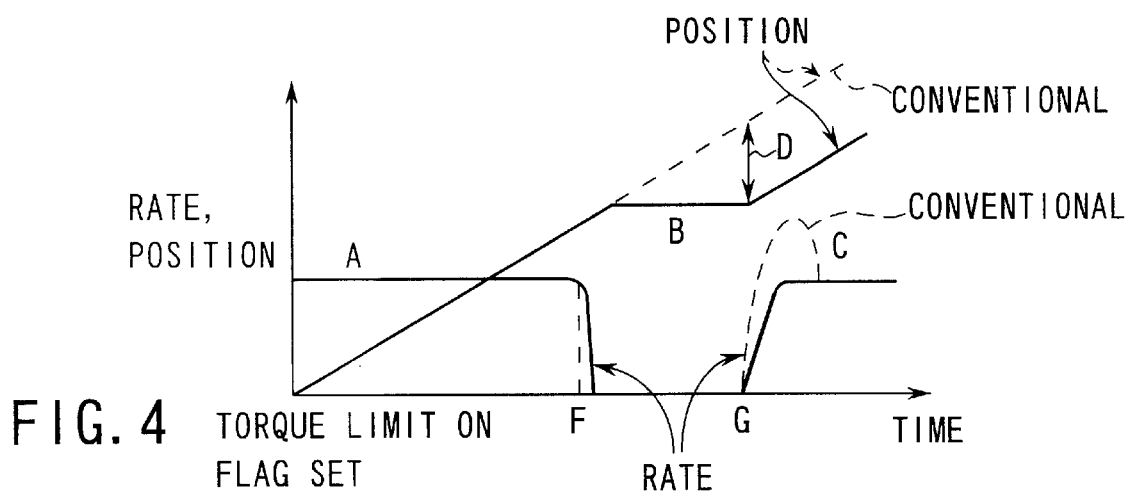
FIG. 4 is a diagram showing position command values and states of rate feedback according to the conventional art and the embodiment.
Figure 5:
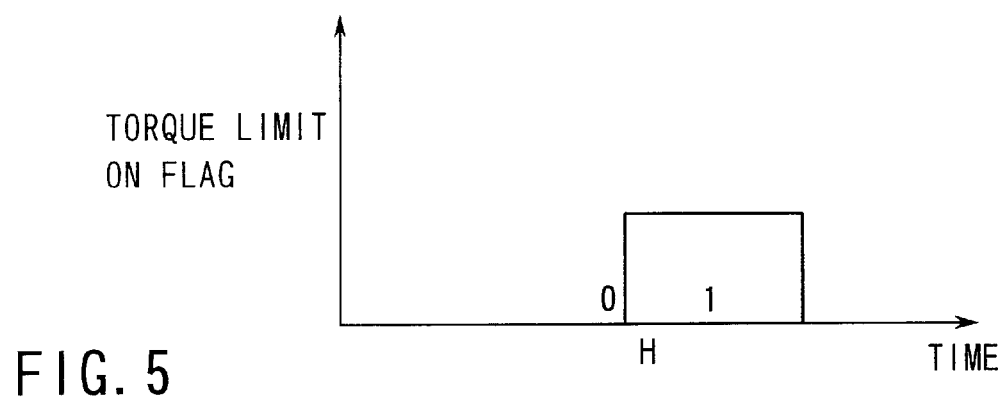
FIG. 5 is a graph showing a change in torque limit ON flag when the servomotor is locked.
Figure 6:
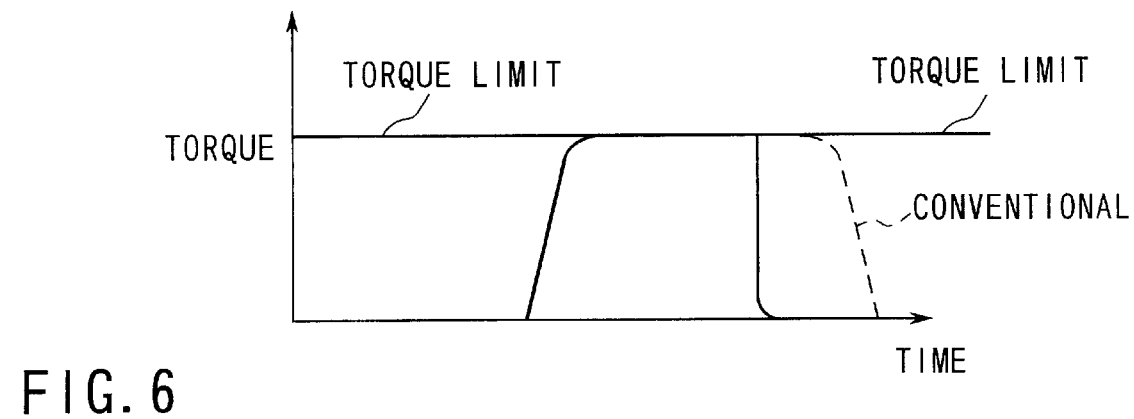
FIG. 6 is a graph showing changes in torque according to the conventional art and the embodiment.

For example, it is assumed that the servomotor 23 is unable to rotate due to product jam at a point F in FIG. 4, which shows a rate curve of the servomotor 23. In this case, the output torque is increased as shown in FIG. 6, and finally reaches the torque limit at a point H in FIG. 5.

According to the conventional art, even if the output torque reaches the torque limit, the position command is nevertheless renewed. However, according to the present invention, the distribution of the position command value is temporarily stopped.

Then, when the jammed product is removed at a point G in FIG. 4, the servomotor 23 becomes able to rotate. In this case, there is a positional error D shown in FIG. 4 according to the conventional art. Therefore, the servomotor is operated at a high speed temporarily.

However, according to the present invention, since the position command is not renewed, there is no positional error D. Therefore, the servomotor can return to the normal control without rotating at a high speed.

The machine operation will be described in detail. First, as shown in FIG. 1, the fixed mold 13 and the movable mold 17 are set apart from each other. A thermoplastic material is introduced through the hopper 27, and the heater 31 is turned on. The plastic melts and flows into a space between the injection sheath 26 and the screw 28.

Figure 7:
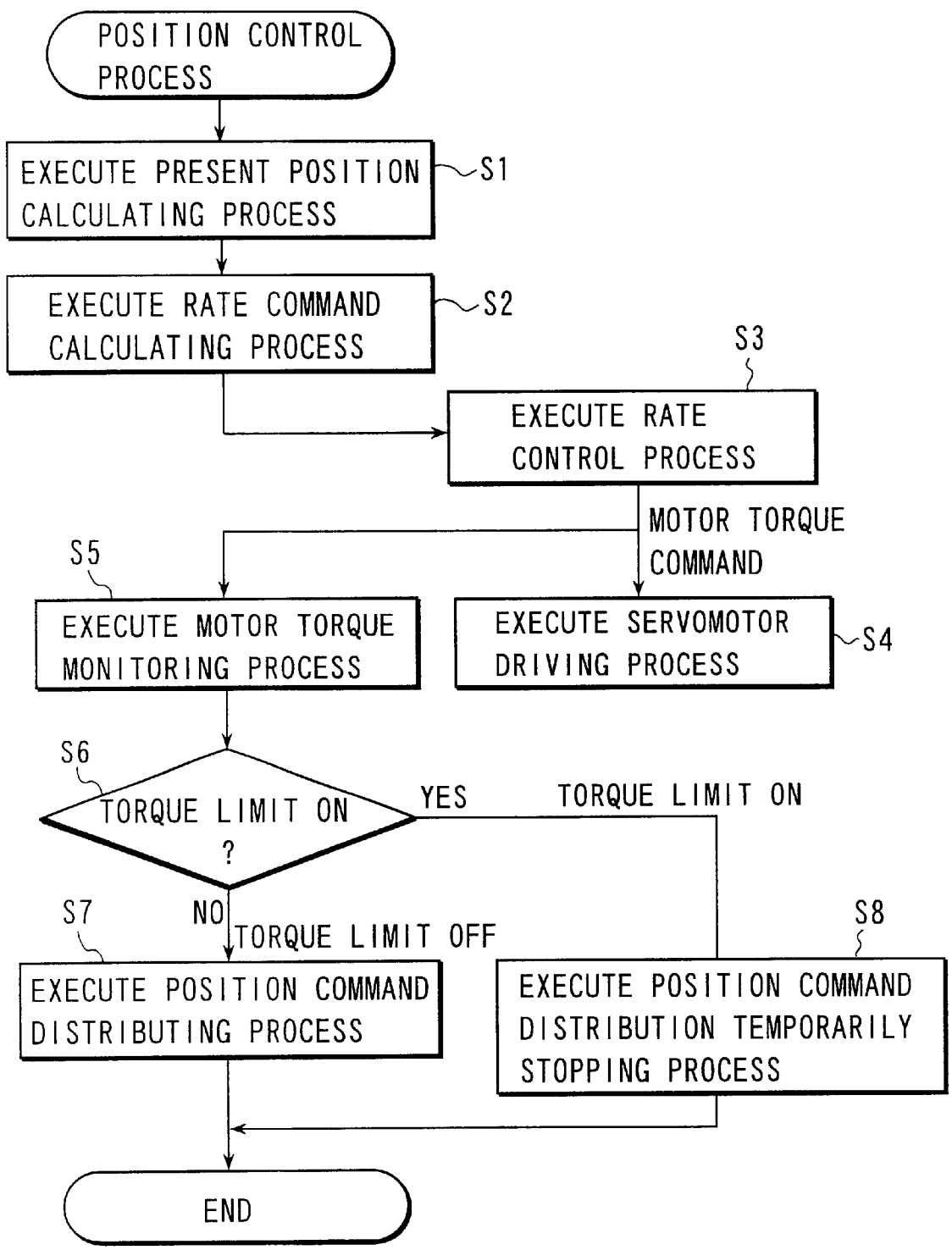
FIG. 7 is a flowchart showing the process of the embodiment.

In this state, if, for example a start button (not shown) is operated, the position control unit 41A fetches the output from the encoder 44 and calculates the present position of the movable mold 17 in the step S1 in FIG. 7. According to the rate output from the command position setting unit 43, the position command output in every unit time from the command position control unit 42 is determined in the step S2, and the rate command is delivered from the position control unit 41A from the difference between the target position and the current position.

The rate command is processed in the rate control process in the step S3, and the corresponding torque command is output. In a step S4, the servomotor is driven by a current in accordance with the torque command.

At the same time, the motor torque monitoring process is carried out in the step S5 to check whether the motor torque exceeds the predetermined value.

When the movable mold 17 is normally moving, the motor torque does not exceed the predetermined value. Therefore, the process advances to the step S7, in which the position command distributing process is carried out. Then, a cycle of the position control process is completed. The process time of one cycle is, for example, 1 millisecond or shorter. The process beginning with the step S1 of the flow shown in FIG. 7 is repeated in every interrupting process at intervals of 1 millisecond.

While the movable mold 17 is moving toward the fixed mold 13, if a product is jammed between the molds, the movable mold 17 is stopped. At this time, if there is a long distance left between the movable mold 17 and the fixed mold 13, the rate command supplied to the servomotor 23 has a large value and a large current is supplied. Therefore, a high torque is generated at a point H in FIG. 5. If the torque exceeds the limit value shown in FIG. 6, the torque limit ON flag is ON, and the process is advanced to the step S8 where the position command distribution is temporarily stopped and the process is terminated without advancing from the step S6 to the step S7.

In the above case, the servomotor 23 is locked and the rate is zero at the point F in FIG. 4. The position command value is not increased unlike in the case of the conventional art indicated by the broken line. The position command value at the point F is not renewed and the position command is stopped. Since the motor torque is also maintained to a constant value as shown in FIG. 6, no excessive current flows and the current at that time is maintained for a predetermined period of time.

In this state, if there is no possibility of restoration in a predetermined period of time, an error process is carried out to stop the machine. However, there is a possibility of the jammed product being removed at the point G in FIG. 4. In this case, according to the present invention, since the motor torque is not increased excessively, the motor rate is not increased rapidly as in the case of the conventional art indicated by the broken line, but merely returned to the normal rate. Therefore, the operator will not be exposed to danger and the machine will not be damaged.

When the movable mold 17 is moved to the position where it abuts on the fixed mold 13 in the normal condition as described above, the screw 28 is driven. The molten plastic is pressed by the spiral of the screw 28 and conveyed inside the injection sheath 26. As a result, the molten plastic is injected through an injection nozzle formed at the top end of the sheath into an injection molding space defined by the fixed mold 13 and the movable mold 17. Then, injection molding is performed. The operation is the same as that of the conventional injection molding machine, and a detailed description thereof is omitted.

In the above embodiment, the relative position of the fixed mold and the movable mold is controlled. However, since the motor-driven injection molding machine has a plurality of servomotors, the present invention can be worked as a position control apparatus for controlling any of those servomotors in the same manner as in the above embodiment.

As described above, according to the present invention, even if the servomotor is locked due to product jam or the like, no excessive current flows through the servomotor. Thus, it is possible to provide a position control apparatus which prevents reduction in yield and operation efficiency, poses no danger to the operator, and avoids damage to the machine.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A position control apparatus comprising:
    a servomotor for driving a movable part of a motor-driven injection molding machine;
    position command means for renewing a position command value of the movable part, the position command value being output in a predetermined cycle in accordance with a positional error between a present position of the movable part and a target position of the movable part;
    limiting means for limiting a current value supplied to the servomotor, when the positional error between the present position of the movable part and the target position of the movable part is equal to or greater than a predetermined value or a rotation rate of the servomotor is equal to or smaller than a predetermined value; and means for stopping a renewal of the position command value or extending a renewal cycle thereof, when the current value is limited.

2. A position control apparatus comprising:

a servomotor for moving a movable mold of a motor-driven injection molding machine to a fixed mold thereof;

a servomotor driving unit;

a command position setting unit for setting a command on a command position of the movable mold, a command rotation rate of the servomotor and a command current value of a current supplied to the servomotor; and a command position control unit for controlling the servomotor driving unit in accordance with the command set by the command position setting unit, said servomotor driving unit comprising:

means for detecting a positional error between a present position of the movable mold and the positional command;

means for detecting a rate error between a present rotation rate and the command rotation rate of the servomotor;

a rate feedback control portion for outputting a limit torque command, when the positional error is equal to or greater than a predetermined value and the rate error is equal to or smaller than a predetermined value; and a current control portion for supplying a torque limit current to the servomotor, when a current, flowing through the servomotor while the limit torque command is output, exceeds a predetermined value, wherein when the torque limit current is supplied to the servomotor, renewal of the command position supplied from the command position setting unit to the servomotor driving unit is stopped.

3. A position control apparatus comprising:

a servomotor for moving a movable mold of an injection molding machine to a fixed mold thereof;

a servomotor driving unit;

a command position control unit for renewing in every unit time a target position of the movable mold based on a moving rate and a present position of the movable mold and supplying a command position to the servomotor driving unit;

a command position setting unit for supplying a moving position, the moving rate and a limit torque value of the movable mold to the command position control unit, said servomotor driving unit including a current output portion, an output current value detecting sensor, a current feedback control portion for controlling the current output portion so that an output current value coincides with a current command value, a rate detecting sensor for detecting a servomotor rotation rate, a rate feedback control portion for controlling the current feedback control portion so that the servomotor rotation rate coincides with a rotation rate command value, a movable mold position sensor, and a position control portion for controlling the rate feedback control portion so that the present position of the movable mold coincides with a position command value thereof, wherein when a torque limit current is supplied to the servomotor, renewal of the command position supplied from the command position control unit to the servomotor driving unit is stopped.

4. A position control apparatus according to claim 3, wherein:

the command position control unit includes means for stopping renewal of the positional command in every time unit by a limit torque output signal output from the servomotor driving unit; and the servomotor driving unit includes means for limiting the output current value by the limit torque value and means for outputting the limit torque output signal in a case where the output current is limited by the limit torque value, and for stopping renewal of the command position supplied to the servomotor driving unit, when an output torque of the servomotor reaches the limit torque value while the movable mold is moving.

5. A position control apparatus according to claim 3, wherein the rate feedback control portion has means for outputting a limit torque output signal for supplying to the current feedback control portion a command for limiting a current command to a limit torque.

6. A position control apparatus according to claim 3, wherein the rate feedback control portion has means for outputting a limit torque output signal to the command position control unit in order to supply a limit current command value calculated from a limit torque command value to the current feedback control portion.

7. A position control apparatus according to claim 3, wherein the command position control unit has means for stopping renewal of the command position in every time unit, in a case where torque commands transmitted from the servomotor driving unit coincide, and the servomotor driving unit has means for converting an output current to torque and transmitting the torque to the command position control unit.

* * * * *